US008665208B2

(12) United States Patent
Lee et al.

(10) Patent No.: US 8,665,208 B2
(45) Date of Patent: Mar. 4, 2014

(54) PRODUCT HAVING ABSOLUTE POSITIONING CODE PATTERN ON A SURFACE THEREOF AND METHOD FOR GENERATING ABSOLUTE POSITIONING CODE PATTERN

(75) Inventors: Seung-gol Lee, Incheon (KR); Jae-hyun Park, Seoul (KR); Dae-hun Nyang, Seoul (KR); Jeon-il Kang, Gongju-si (KR)

(73) Assignee: Pen Laboratory Inc. (KR)

( * ) Notice: Subject to any disclaimer, the term of this patent is extended or adjusted under 35 U.S.C. 154(b) by 1326 days.

(21) Appl. No.: 12/441,676

(22) PCT Filed: Sep. 3, 2007

(86) PCT No.: PCT/KR2007/004224
§ 371 (c)(1),
(2), (4) Date: Mar. 17, 2009

(87) PCT Pub. No.: WO2008/035865
PCT Pub. Date: Mar. 27, 2008

(65) Prior Publication Data
US 2009/0260899 A1    Oct. 22, 2009

(30) Foreign Application Priority Data
Sep. 18, 2006  (KR) .................... 10-2006-0090064

(51) Int. Cl.
*G09G 5/00* (2006.01)
(52) U.S. Cl.
USPC .............................................. 345/156
(58) Field of Classification Search
USPC .................... 345/156–184; 178/18.01–20.04
See application file for complete search history.

(56) References Cited

U.S. PATENT DOCUMENTS

| 5,477,012 | A  | * | 12/1995 | Sekendur ............. 178/18.09 |
| 6,586,688 | B2 | * | 7/2003  | Wiebe ................. 178/18.09 |
| 7,600,693 | B2 | * | 10/2009 | Pettersson ............ 235/494   |
| 7,817,816 | B2 | * | 10/2010 | Wang et al. ........... 382/100   |
| 2002/0046887 | A1 | * | 4/2002 | Yanagisawa et al. .... 178/18.01 |
| 2002/0070281 | A1 |   | 6/2002 | Nimura et al. |
| 2003/0104938 | A1 |   | 6/2003 | Torii et al. |

FOREIGN PATENT DOCUMENTS

| JP | 07-141104     | 6/1995 |
| WO | WO-01/26033 A1 | 4/2001 |
| WO | WO-01/26034 A1 | 4/2001 |
| WO | WO-2006/065045 A1 | 6/2006 |

\* cited by examiner

*Primary Examiner* — Alexander Eisen
*Assistant Examiner* — Patrick F Marinelli
(74) *Attorney, Agent, or Firm* — Harness, Dickey & Pierce, P.L.C.

(57) ABSTRACT

Disclosed is a product having an absolute positioning pattern on its surface and a method for forming the absolute pattern. The product includes first cells displaying coded binary data or displaying coded data expressed in terms of at least three digits; second cells displaying data coded in a manner different from the first cells or having no data; and a unit cell pattern formed by a group of at least a predetermined number of the first and second cells. The combination of data corresponding to the first cells within the unit cell pattern indicates an absolute coordinate of the corresponding unit cell pattern, and the unit cell pattern is differentiated from other adjacent unit cell patterns by the second cells within the unit cell pattern. The disclosed product and method require a smaller amount of operation to calculate the coordinate value compared with the prior art, but can display a broader position.

26 Claims, 14 Drawing Sheets

FIG. 2

| 0 | 0 | 0 | 0 | 0 | 0 | 0 | 0 | 0 | 0 | 0 | 1 | 0 | 0 | 0 | 1 |
|---|---|---|---|---|---|---|---|---|---|---|---|---|---|---|---|
| 0 | 0 | 0 | 0 | 0 | 0 | 0 | 1 | 0 | 0 | 0 | 0 | 0 | 0 | 0 | 1 |
| 0 | 0 | 0 | ■ | 0 | 0 | 0 | ■ | 0 | 0 | 0 | ■ | 0 | 0 | 0 | ■ |
| 0 | 0 | ■ | ■ | 0 | 0 | ■ | ■ | 0 | 0 | ■ | ■ | 0 | 0 | ■ | ■ |

FIG. 3

| 13 | 9 | 5 | 2 |
|----|---|---|---|
| 12 | 8 | 4 | 1 |
| 11 | 7 | 3 | ■ |
| 10 | 6 | ■ | ■ |

FIG. 4

| 0 | 0 | 0 | 0 | 0 | 0 | 0 | 0 | 0 | 1 | 0 | 0 | 0 | 1 |
| 0 | 0 | 0 | 0 | 0 | 0 | 0 | 1 | 0 | 0 | 0 | 0 | 0 | 0 | 1 |
| 0 | 0 | 0 |   | 0 | 0 | 0 |   | 0 | 0 | 0 |   | 0 | 0 | 0 |   |
| 0 | 0 |   |   | 0 | 0 |   |   | 0 | 0 |   |   | 0 | 0 |   |   |
| 0 | 0 | 0 | 0 | 0 | 0 | 0 | 0 | 0 | 1 | 0 | 0 | 0 | 1 |
| 0 | 0 | 0 | 0 | 0 | 0 | 0 | 1 | 0 | 0 | 0 | 0 | 0 | 0 | 1 |
| 0 | 0 | 0 |   | 0 | 0 | 0 |   | 0 | 0 | 0 |   | 0 | 0 | 0 |   |
| 0 | 0 |   |   | 0 | 0 |   |   | 0 | 0 |   |   | 0 | 0 |   |   |

FIG. 5

| 1 | 1 | 1 | 1 | 1 | 1 | 1 | 0 | 0 | 0 | 0 | 0 | 0 | 0 | 0 |
| 1 | 1 | 1 | 0 | 1 | 1 | 1 | 0 | 0 | 0 | 0 | 0 | 0 | 0 | 1 |
| 1 | 1 | 1 |   | 1 | 1 | 1 |   | 0 | 0 | 0 |   | 0 | 0 | 0 |   |
| 1 | 1 |   |   | 1 | 1 |   |   | 0 | 0 |   |   | 0 | 0 |   |   |

FIG. 6

| 0 | 0 | 0 | 0 |
|---|---|---|---|
| 0 | 0 | 0 | 0 |
| 0 | 0 | 0 |   |
| 0 | 0 |   |   |
| 0 | 0 | 0 | 0 |
| 0 | 0 | 0 | 0 |
| 0 | 0 | 0 |   |
| 0 | 1 |   |   |
| 0 | 0 | 0 | 0 |
| 0 | 0 | 0 | 0 |
| 0 | 0 | 0 |   |
| 1 | 0 |   |   |
| 0 | 0 | 0 | 0 |
| 0 | 0 | 0 | 0 |
| 0 | 0 | 0 |   |
| 1 | 1 |   |   |

| (0,0) | (0,0) | (0,0) | (0,0) | (0,0) | (0,0) | (0,0) | (0,0) | (0,0) | (0,0) | (0,0) | (1,0) | (0,0) | (0,0) | (0,0) | (1,0) |
|---|---|---|---|---|---|---|---|---|---|---|---|---|---|---|---|
| (0,0) | (0,0) | (0,0) | (0,0) | (0,0) | (0,0) | (0,0) | (1,0) | (0,0) | (0,0) | (0,0) | (0,0) | (0,0) | (0,0) | (0,0) | (1,0) |
| (0,0) | (0,0) | (0,0) | ■ | (0,0) | (0,0) | (0,0) | ■ | (0,0) | (0,0) | (0,0) | ■ | (0,0) | (0,0) | (0,0) | ■ |
| (0,0) | (0,0) | ■ | ■ | (0,0) | (0,0) | ■ | ■ | (0,0) | (0,0) | ■ | ■ | (0,0) | (0,0) | ■ | ■ |
| (0,0) | (0,0) | (0,0) | (0,0) | (0,0) | (0,0) | (0,0) | (0,0) | (0,0) | (0,0) | (0,0) | (1,0) | (0,0) | (0,0) | (0,0) | (1,0) |
| (0,0) | (0,0) | (0,0) | (0,0) | (0,0) | (0,0) | (0,0) | (1,0) | (0,0) | (0,0) | (0,0) | (0,0) | (0,0) | (0,0) | (0,0) | (1,0) |
| (0,0) | (0,0) | (0,0) | ■ | (0,0) | (0,0) | (0,0) | ■ | (0,0) | (0,0) | (0,0) | ■ | (0,0) | (0,0) | (0,0) | ■ |
| (0,0) | (0,1) | ■ | ■ | (0,0) | (0,1) | ■ | ■ | (0,0) | (0,1) | ■ | ■ | (0,0) | (0,1) | ■ | ■ |
| (0,0) | (0,0) | (0,0) | (0,0) | (0,0) | (0,0) | (0,0) | (0,0) | (0,0) | (0,0) | (0,0) | (1,0) | (0,0) | (0,0) | (0,0) | (1,0) |
| (0,0) | (0,0) | (0,0) | (0,0) | (0,0) | (0,0) | (0,0) | (1,0) | (0,0) | (0,0) | (0,0) | (0,0) | (0,0) | (0,0) | (0,0) | (1,0) |
| (0,0) | (0,0) | (0,0) | ■ | (0,0) | (0,0) | (0,0) | ■ | (0,0) | (0,0) | (0,0) | ■ | (0,0) | (0,0) | (0,0) | ■ |
| (0,1) | (0,0) | ■ | ■ | (0,1) | (0,0) | ■ | ■ | (0,1) | (0,0) | ■ | ■ | (0,1) | (0,0) | ■ | ■ |
| (0,0) | (0,0) | (0,0) | (0,0) | (0,0) | (0,0) | (0,0) | (0,0) | (0,0) | (0,0) | (0,0) | (1,0) | (0,0) | (0,0) | (0,0) | (1,0) |
| (0,0) | (0,0) | (0,0) | (0,0) | (0,0) | (0,0) | (0,0) | (1,0) | (0,0) | (0,0) | (0,0) | (0,0) | (0,0) | (0,0) | (0,0) | (1,0) |
| (0,0) | (0,0) | (0,0) | ■ | (0,0) | (0,0) | (0,0) | ■ | (0,0) | (0,0) | (0,0) | ■ | (0,0) | (0,0) | (0,0) | ■ |
| (0,1) | (0,1) | ■ | ■ | (0,1) | (0,1) | ■ | ■ | (0,1) | (0,1) | ■ | ■ | (0,1) | (0,1) | ■ | ■ |

FIG. 11

| SYMBOL'S MEANING VALUE | X COORDINATE VALUE | Y COORDINATE VALUE |
|---|---|---|
| 0 | 1 | 1 |
| 1 | 0 | 1 |
| 2 | 1 | 0 |
| 3 | 0 | 0 |

FIG. 15

PRODUCT HAVING ABSOLUTE POSITIONING CODE PATTERN ON A SURFACE THEREOF AND METHOD FOR GENERATING ABSOLUTE POSITIONING CODE PATTERN

TECHNICAL FIELD

The present invention relates to a product having an absolute positioning pattern on its surface and a method for forming the absolute positioning pattern.

BACKGROUND ART

Various methods have recently been tried to position an object (e.g. a writing tool) on a surface that has data or no data recorded thereon. Particularly, in connection with a positioning method using an electronic pen, a two- or three-dimensional positioning device for inputting graphic data (e.g. handwritten documents, symbols, drawings, etc) has become commercially available. Such devices convert the positional information, which has been sensed by position sensing means, into coordinates and determine the absolute position of the sensing means on a surface having data or no data recorded thereon.

A sensing means, such as a recording tablet, may be used to input handwritten data. Most two-dimensional devices are operated based on the contact between the recording tablet and the sensing means.

In general, there are two types of relationships between the sensing means and the recording tablet: passive sensing means/active tablet and active sensing means/passive tablet relationships, based on which the devices are driven.

In the case of the passive sensing means/active tablet mode, the active tablet is complicated, large, heavy, difficult to carry, and expensive. In addition, the active tablet is difficult to manufacture, and its complicated electric/mechanical structure makes it susceptible to erroneous operations (e.g. errors in position recognition).

In order to solve these problems, a device has been conceived to easily determine the absolute position of sensing means. The device includes a data recording surface provided with a coding pattern for determining the X-Y coordinate, a sensor for sensing the coding pattern, and a processor for determining the current position of the sensor based on the sensed coding pattern. The device, when driven, displays data on the computer screen when the user writes or draws, by hand, characters or image data on the data recording surface.

Exemplary coding methods by using such a device will now be described.

According to one of such methods, symbols are patternized for positional coding, as shown in FIG. 1. Particularly, each symbol consists of three concentric circles, the outermost one of them corresponds to the X coordinate, and the middle one corresponds to the Y coordinate. The outer and middle circles are divided into 16 portions, which indicate different codes depending on whether or not the interior of the circles is filled. This means that each coordinate pair is coded by complicated symbols having specific appearances.

In FIG. 1, reference numeral 1 generally designates a prior art positioning pattern structure in its entirety. Reference numeral 2 designates a single pattern structure of the entire positioning pattern structure 1. Reference numeral 3 designates a quadrant of the single pattern structure 2. Reference numeral 4 designates a center (as a reference point) of the structure 2. Reference numeral 5 designates a middle circle including information about a Y-coordinate and divided into sixteen zones. Reference numeral 6 designates an outermost circle having information about an X-coordinate and divided into sixteen zones. Reference numeral 7 designates a unit cell having information of X,Y coordinates in a single pattern (a cell pattern includes sixteen cells).

Another method employs a check pattern for coding X and Y coordinates in a manner similar to the above-mentioned method of using concentric circles.

Such conventional patterns have a problem in that, the more complicated and smaller symbols they consist of, the more difficult it is to realize patterns on the recording surface. If the sensing means has insufficient resolution, it may not accurately recognize fine patterns and result to erroneous positioning. If the pattern symbols are enlarged or simplified, the same pattern may be recognized in different positions on the recording surface. In such a case, redundant microcodes degrade the precision in absolute positioning. As a result, the position sensing means cannot accurately sense the position.

DISCLOSURE OF THE INVENTION

Therefore, the present invention has been made in view of the above-mentioned problems, and the present invention provides a product having an absolute positioning pattern on its surface so that patterns are easily realized by data codes composed of simple symbols while improving the precision in determining the absolute position, and a method for forming the absolute positioning pattern.

According to an aspect of the present invention, there is provided a product having an absolute positioning pattern on a surface, the absolute positioning pattern including first cells displaying coded binary data or displaying coded data expressed in terms of at least three digits; second cells displaying data coded in a manner different from the first cells or having no data; and a unit cell pattern formed by a group of at least a predetermined number of the first and second cells, wherein a combination of data corresponding to the first cells within the unit cell pattern indicates an absolute coordinate of the corresponding unit cell pattern, and the unit cell pattern is differentiated from other adjacent unit cell patterns by the second cells within the unit cell pattern.

The product unit cell pattern includes N×M cells (N and M are integers, N=M or N≠M). The position of each cell within the unit cell pattern indicates a digit place of data indicating a value of the absolute coordinate. The digit place of the data may become higher in a cell position closer to left and top. Alternatively, the digit place of the data may become higher in a cell position more distant from a center in a helical direction.

The second cells exist in predetermined positions within the unit cell pattern. There is at least one second cell within the unit cell pattern. When there are at least three second cells, the second cells are connected with one another by line segments in a shape having no rotational symmetry, the shape being selected from ], ], and ⊥. The rotational condition of the product can be identified based on the second cells.

The error of the absolute coordinate can be corrected by using a value of data corresponding to the second cells within the unit cell pattern. The error may be corrected with regard to bits at the entire digit places in data indicating the absolute coordinate, or with regard to lower bits lying at or below a predetermined digit place.

The X coordinate value of the absolute coordinate value of the unit cell pattern may increase by one rightward in a row of unit cell patterns, and the Y coordinate value of the absolute coordinate value of the unit cell pattern may increase by one downward in a longitudinal direction in a column of unit cell patterns. Alternatively, the X coordinate value may increase by one leftward, and the Y coordinate may increase by one upward.

The symbols of data coded and displayed on the first cells may be indicated by line segments having different arrangement angles relative to a virtual X or Y axis, which intersect with each other, with the point of intersection of the X and Y axes at the center of the line segments so that the data values of respective cells can be variously expressed according to the arrangement angles. For example, the binary data coded and displayed on the first cells is indicated by a line segment selected from the group consisting of a line segment lying on a virtual X axis with a point of intersection of the virtual X axis and a virtual Y axis at a center of the line segment, the point of intersection passing through a center point of respective cells, a line segment lying on the Y axis with the point of intersection at a center of the line segment, a line segment lying on 1/3 quadrants with the point of intersection at a center of the line segment, and a line segment lying on 2/4 quadrants with the point of intersection at a center of the line segment. The line segment on the X axis corresponds to an X and Y coordinate value of (1,1); the line segment on the Y axis corresponds to an X and Y coordinate value of (0, 1); the line segment on the 1/3 quadrants corresponds to an X and Y coordinate value of (1,0); and the line segment on the 2/4 quadrants corresponds to an X and Y coordinate value of (0,0).

It is to be noted that the mark "/" used to described quadrants refers to "and" throughout the specification. For example, "1/3 quadrants" refer to both the first and third quadrants.

The binary data coded and displayed on the second cells may be indicated by a line segment selected from the group consisting of a line segment lying on 1/2 quadrants in a direction parallel to a virtual X axis intersecting with a virtual Y axis, a line segment lying on 3/4 quadrants in a direction parallel to the X axis, a line segment lying on 2/3 quadrants in a direction parallel to the Y axis, and a line segment lying on 1/4 quadrants in a direction parallel to the Y axis. The line segment on the 1/2 quadrants in a direction parallel to the X axis corresponds to an X and Y coordinate value of (1,1); the line segment on the 3/4 quadrants in a direction parallel to the X axis coordinate value of (0, 1); the line segment on the 2/3 quadrants in a direction parallel to the Y axis corresponds to an X and Y coordinate value of (1,0); and the line segment on the 1/4 quadrants in a direction parallel to the Y axis corresponds to an X and Y coordinate value of (0,0).

Alternatively, the binary data coded and displayed on the second cells may be indicated by line segments in a manner similar to the line segments of the first cells except that different lengths are used to different the line segments from the line segments of the first cells.

The binary data coded and displayed on the second cells may be indicated by a line segment selected from the group consisting of a line segment extending from a point of intersection of virtual X and Y axes to a point on a first quadrant, a line segment extending from the point of intersection to a point on a second quadrant, a line segment extending from the point of intersection to a point on a third quadrant, and a line segment extending form the point of intersection to a point on a fourth quadrant.

According to another aspect of the present invention, there is provided a method for forming an absolute positioning pattern, the method including the steps of forming first cells displaying coded binary data or displaying coded data expressed in terms of at least three digits; forming second cells displaying data coded in a manner different from the first cells or having no data; forming a unit cell pattern by using a group of at least a predetermined number of the first and second cells; indicating an absolute coordinate of the unit cell pattern by using a combination of data corresponding to the first cells within the unit cell pattern; and differentiating the unit cell pattern from other adjacent unit cell patterns by the second cells within the unit cell pattern.

BRIEF DESCRIPTION OF THE DRAWINGS

The foregoing and other objects, features, and advantages of the present invention will become more apparent from the following detailed description when taken in conjunction with the accompanying drawings in which:

FIG. 2 shows an exemplary product having an absolute positioning pattern on its surface according to the present invention;

FIGS. 3 to 6 show an exemplary method for assigning the X coordinate of an absolute positioning pattern according to the present invention;

FIGS. 7 to 10 show an exemplary method for assigning the Y coordinate of an absolute positioning pattern according to the present invention;

FIG. 11 shows another exemplary product having an absolute positioning pattern on its surface according to the present invention as a combination of those shown in FIGS. 5 and 9;

FIG. 15 shows X, Y coordinate values corresponding to values given to respective line segments shown in FIG. 14;

BEST MODE FOR CARRYING OUT THE INVENTION

Figure 1:
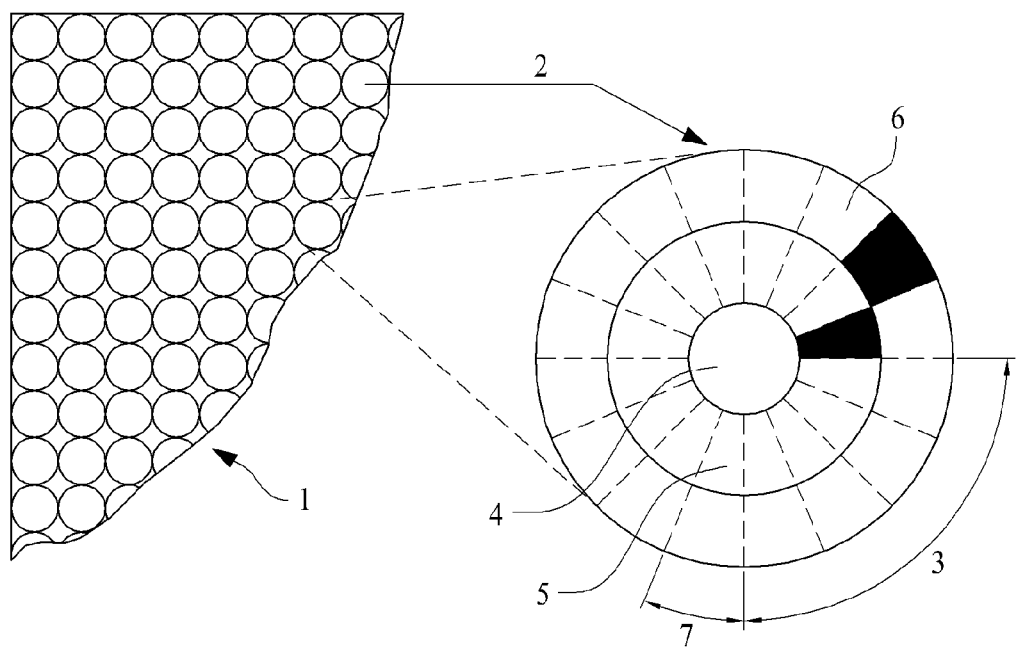
FIG. 1 shows an exemplary positioning pattern according to the prior art.

Hereinafter, preferred embodiments of the present invention will be described in detail with reference to the accompanying drawings. It is to be noted that the same reference numerals are used to designate the same elements throughout the specification. In addition, detailed descriptions of known functions and configurations incorporated herein is omitted to avoid making the subject matter of the present invention unclear.

Figure 2:
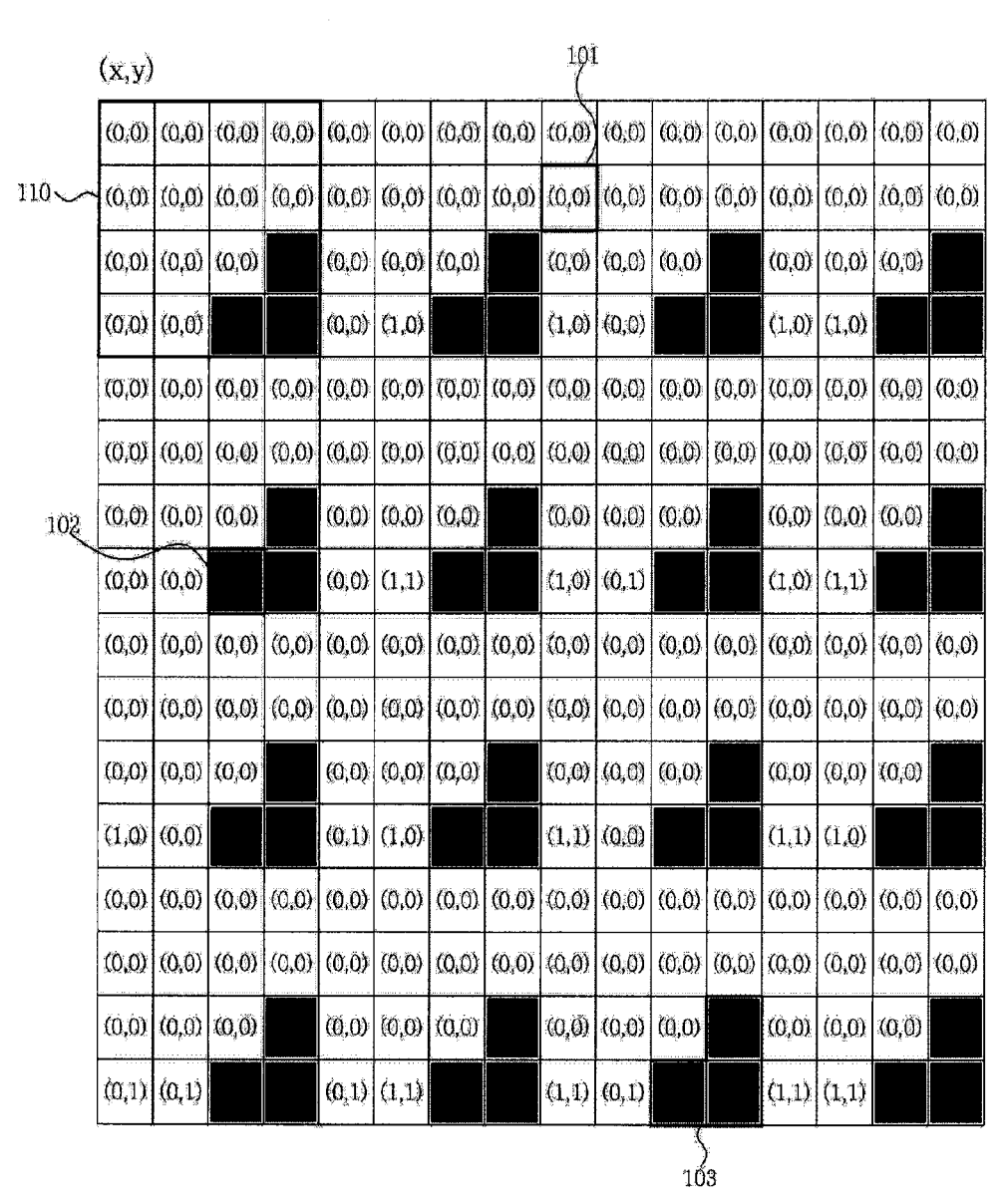

FIG. 2 shows a product having an absolute positioning pattern on its surface according to a preferred embodiment of the present invention. Particularly, FIG. 2 shows the absolute positioning pattern of the product.

As shown in FIG. 2, an absolute positioning pattern formed on the surface of a product according to the present invention includes first cells 101 displaying coded binary data; second cells 102 displaying binary data coded in a manner different from that of the first cells 101 or displaying no data; and unit cell patterns 110 consisting of a group of at least a predetermined number of first and second cells 101 and 102.

As shown in FIG. 2, according to the present invention, each cell 101 displays binary data information regarding both X and Y coordinates, e.g. (0,0), (0,1), (1,0), or (1,1).

Although it is assumed in the present embodiment that respective cells 101 and 102 display coded binary data, the type of data is not limited to that, and the data may be three-digit data, four-digit data, etc.

As shown in FIG. 2, according to the present embodiment, the unit cell patterns 110 consist of a group of N×M (4×4) cells 101 and 102, which constitute a specific size of cells separately read and recognized as a whole by a sensing means (e.g. pen's pointer), and which will hereinafter be referred to as a window. The 4×4 unit cell patterns 110 consist of thirteen first cells 101 and three second cells 102. Although N and M of the unit cell patterns 110 are the same in the present embodiment, the relationship between them is not limited to that (i.e. N and M may differ from each other).

The combination of binary data corresponding to the thirteen first cells 101 indicates the absolute coordinate value (or window value) of the corresponding unit cell pattern. The three second cells 102 are in a specific position within the unit cell patterns 110 (e.g. lower right corner), and are connected to one another by line segments in a specific shape (e.g. ⌋). Such a group of three second cells 102 in a specific position within the unit cell pattern 110 and in a specific shape will be referred to as a direction flag 103. The position of the direction flag 103 makes it possible to distinguish a specific unit cell pattern 110 from other neighboring unit cell patterns, and the shape makes it possible to identify the direction of the product (e.g. paper) and determine the degree of rotation of it, as will be described later in more detail. Although the direction flag 103 has the shape of ⌋ in the present embodiment, the shape is not limited to that, and may be varied in any manner as long as it tells the rotational condition of the product (e.g. ⌉, ⊥).

An exemplary method for assigning the X and Y coordinates of the absolute positioning patterns according to the present invention will be described in more detail with reference to FIGS. 3 to 10.

Method For Assigning X Coordinate On Absolute Positioning Pattern

FIG. 3 shows exemplary unit cell patterns 110 in the same row on an absolute positioning pattern according to the present invention. As has been mentioned with reference to FIG. 2, each cell has data regarding both X and Y coordinates, but data regarding the X coordinate only will be separately described with reference to FIG. 3.

As shown in FIG. 3, the binary window value of the unit cell patterns 110 gradually increases by 1 in the X direction (rightward direction) in the following manner: 0000000000000→0000000000001→0000000000010→000000000011. Particularly, the binary window value is a sequence of binary digits, which correspond to the thirteen first cells 101 within each unit cell pattern 110, placed in the order of 1-13 shown in FIG. 4. Such a regular increase of the binary window value of the unit cell patterns 110 in the X direction (rightward direction) makes it possible to restore the actual window value, even if the coordinate window does not exactly conform to the actual window. As used herein, the coordinate window refers to a group of N×M cells actually read by a coordinate sensing means (e.g. pen's pointer). It is to be noted that, when actually applied, images observed by the pen pointer may be larger than the coordinate window.

Then, the unit cell patterns arranged in the same row, as shown in FIG. 3, are repeatedly arranged in the Y direction (upward/downward direction) over a plurality of rows, as shown in FIG. 5.

FIG. 6 shows an embodiment alternative to that shown in FIG. 3. As shown in FIG. 6, the window value does not necessarily begin from 0, and any digit may be used in the initial position. Based on this fact, when the window value is to be read by the pen relative to the starting point, an arbitrary value is subtracted from the currently read window value. If the maximum value that can be displayed by any window value is reached, the next window value may be set to 0.

Method for Assigning Y Coordinate on Absolute Positioning Pattern

FIG. 7 shows exemplary unit cell patterns 110 in the same column on an absolute positioning pattern according to the present invention. As has been mentioned with reference to FIG. 2, each cell has data regarding both X and Y coordinates, but data regarding the Y coordinate only will be separately described with reference to FIG. 7.

As shown in FIG. 7, the binary window value of the unit cell patterns 110 gradually increases by 1 in the Y direction (downward direction) in the following manner: 0000000000000→0000000000001→0000000000010→000000000011. Particularly, the binary window value is a sequence of binary digits, which correspond to the thirteen first cells 101 within each unit cell pattern 110, placed in the order of 1-13 shown in FIG. 8. Such a regular increase of the binary window value of the unit cell patterns 110 in the Y direction (downward direction) makes it possible to restore the actual window value, even if the coordinate window does not exactly conform to the actual window.

Figures 8, 9:
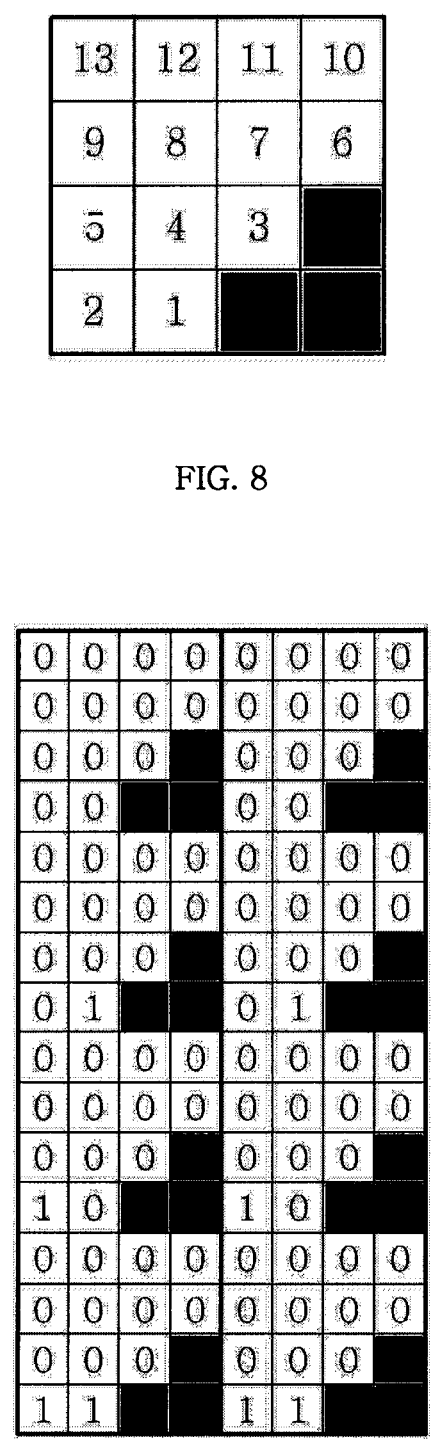

For reference, FIG. 4 shows the order of assigning the X coordinate to each cell, and FIG. 8 shows the order to assigning the Y coordinate to each cell. However, the assigning order is not limited to that. For example, the order shown in FIG. 4 or 5 may be applied to both X and Y coordinates. Alternatively, the order shown in FIG. 4 is applied to the Y coordinate, and that shown in FIG. 8 to the X coordinate. Furthermore, although not shown in the drawings, the cells in the same window may be positioned in a helical direction away from the center so that they correspond respective places of the binary data in the ascending order.

Then, the unit cell patterns arranged in the same column, as shown in FIG. 7, are repeatedly arranged in the X direction (transverse direction) over a plurality of columns, as shown in FIG. 9.

Figure 10:
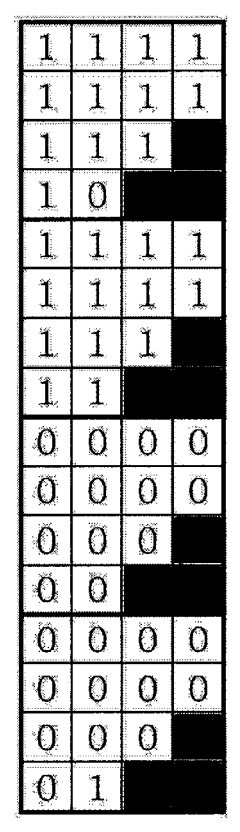

FIG. 10 shows an embodiment alternative to that shown in FIG. 7. As shown in FIG. 10, the window value does not necessarily begin from 0, and any digit may be used in the initial position. Based on this fact, when the window value is to be read by the pen relative to the starting point, an arbitrary value is subtracted from the currently read window value. If the maximum value that can be displayed by any window value is reached, the next window value may be set to 0.

As mentioned above, the absolute positioning patterns according to the present invention are constructed by assigning X coordinate values to respective cells as shown in FIG. 5, assigning Y coordinate values to respective cells as shown in FIG. 9, and combining the X coordinate values with the Y coordinate values in the same cell position. The resulting absolute positioning patterns are shown in FIG. 11.

It is clear from the comparison between the absolute positioning patterns shown in FIGS. 2 and 11 that the binary data value assigned to the corresponding cells slightly differ from each other. Such a difference results from the manner of assigning/combining binary data corresponding to the second cells in the unit cell patterns, as has been described with reference to FIGS. 4 and 8. Particularly, the absolute positioning pattern shown in FIG. 2 corresponds to an example of applying the order of assigning/combining binary data shown in FIG. 8 to both X and Y coordinates, and the absolute positioning pattern shown in FIG. 11 corresponds to an example of applying/combining the orders of assigning/combining the binary data shown in FIGS. 4 and 8 to the X and Y coordinates, respectively. However, in either case, the absolute positioning patterns shown in FIGS. 2 and 11 have the same absolute coordinate value of corresponding unit cell patterns.

The direction flag 103 shown in FIG. 2 will now be described in more detail.

The second cells 102 constituting the direction flag 103 must be arranged in such a manner that the direction flag itself has a directive feature. At least three second cells must be used to this end. If fewer second cells are used, at least two directive features exist no matter how the second cells are arranged. It is to be noted that, if the direction flag 103 is not used to sense rotation but just to correct errors, two or more cells are enough to constitute the direction flag. Furthermore, if the direction flag 103 is used just to differentiate adjacent unit cell patterns from one another, only a single second cell may constitute the direction flag.

Those skilled in the art can understand that, if the direction flag 103 is not used to correct errors but just to sense rotation, the second cells 102 constituting the direction flag 103 contain no information or information coded and displayed in a manner different from that of the first cells 101.

When the direction flag 103 is used just to sense rotation, three second cells 102 containing no information are enough, and line segments preferably connect them in the shape of ⌋.

Figure 12:
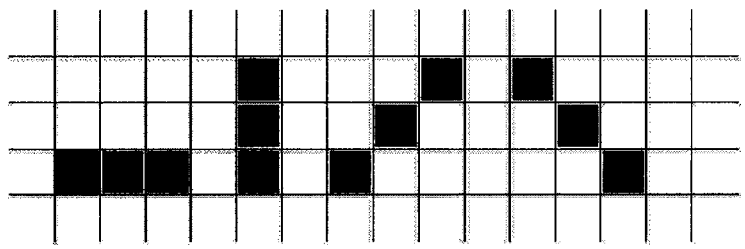
FIG. 12 shows an exemplary construction of a direction flag which has no directive feature.

When three cells are arranged in a straight line with no central point as shown in FIG. 12, they have no directive feature and are useless. Such an arrangement must be excluded.

Figure 13:
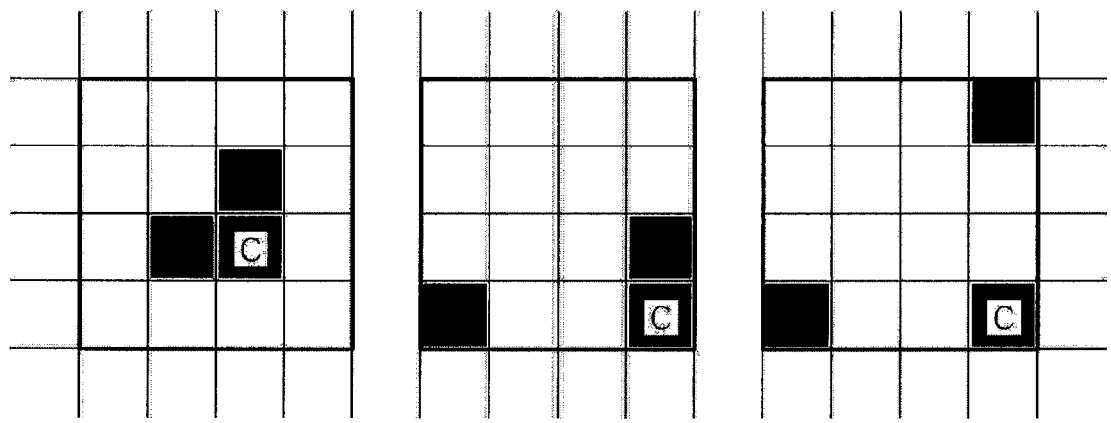
FIG. 13 shows the number of odds of the distribution of direction flag cells on a coordinate window.

Assuming that a direction flag in the shape of ⌋ is used, there are three types of distribution of the second cells that may be considered on the coordinate window to find the angle of rotation (90°, 180°, 270°) of a piece of paper having an absolute positioning pattern printed thereon, as shown in (a), (b), and (c) of FIG. 13. Particularly, in FIG. 13, (a) shows a single group of cells on the coordinate window, (b) shows two separate groups of cells, and (c) shows three separate groups of cells.

In any case of (a), (b), or (c) of FIG. 13, the cell c acting as the central point is initially identified, and it is confirmed if the other cells spaced from the cell c are in the opposite position relative to the central point. As a result, the rotated direction flag is restored.

It can be said that, if the restored direction flag has the shape of ⌉, it has been rotated by 90° clockwise. Likewise, the shape of ⌈ corresponds to 180° rotation, and the shape of ⌋ corresponds to 90° counterclockwise rotation. For example, the direction flag shown in (a) of FIG. 13 has undergone no rotation; the direction flag shown in (b) of FIG. 13, when restored, gives the shape of ⌊, which corresponds to 90° clockwise rotation; and the direction flag shown in (c) of FIG. 13, when restored, gives the shape of ⌈, which corresponds to 180° rotation. Such a relationship is used to determine the angle of rotation of the product (e.g. paper) and to rotate the matrix of cells on the coordinate window accordingly.

The correction of errors of absolute positioning patterns according to the present invention will now be described.

For error correction, the second cells of the direction flag for identifying the window display two-bit binary data that has been coded in a manner different from that of the first cells. The two-bit values correspond to the error correcting code of the X and Y coordinates, respectively. The error correcting codes for the X and Y coordinates are separately operated in a similar manner. Therefore, the error correcting code will be described with reference to only the X coordinately for clarity.

A single 4×4 window contains 13 bits of information regarding the X coordinate, but it must have at least 4 bits of redundancy for 2-bit error correction. The optimal algorithm for block codes, i.e. RS (Reed-Solomon) code, has the code type of ($2^k-1$, $2-1-k$). In other words, data of $2^k-1-k$ bits is reconstructed into a codeword of $2^k-1$ bits, so that errors of up to 2 bits can be corrected. In this case, k refers to the number of codes for error correction. If k=4, 12 out of 16 cells are used for data, and 4 cells are used as error correcting codes. To this end, the number of second cells constituting the direction flag must be increased by one (i.e. a total of four). In this case, 11 of the 12 cells are subjected to error correction, and the remaining one cell is subjected to error processing in the upper layer.

Except for the upper one bit, the remaining bits are corrected in the following manner:

The number of second cells constituting the direction flag is changed to four. Respective second cells are coded based on representation different from that of the first cells so that the second cells can contain 2-bit information. Even if four second cells are used, the position of patterns is calculated in the same manner, except that the number of the first cells in the window is reduced by one. Then, the RS coding, which is one of error correcting codes, is used to calculate (encode) an error correcting code regarding all or some of information in the data cells and to display the coding result on the direction flag cells. If the window is not correctly read, the error correcting code cannot function properly. However, it is also possible to correct errors by calculating the position according to the original position calculating method and conducting RS decoding. This, however, may not provide correct restoration because an estimated codeword, not the original RS-encoded codeword, is subjected to RS decoding.

A method for correcting the error of lower bits only will now be described.

Considering that digits in higher places of binary data constituting a window undergo lesser changes than those in lower places, the number of second cells constituting a direction flag can be reduced if digits in lower places are solely subjected to error correction. This makes it possible to realize a larger number of different unit cell patterns (windows). From another point of view, the possibility that all of three cells may not be recognized simultaneously is lower than the possibility that all of four cells may not be recognized simultaneously. As a result, the error correction function is more likely to work properly.

Those skilled in the art can easily understand that, although the RS coding has been adopted to correct errors of the absolute positioning pattern in the above description, the coding type is not limited to that.

The codes of binary data displayed on the first and second cells will now be described.

Figure 14:
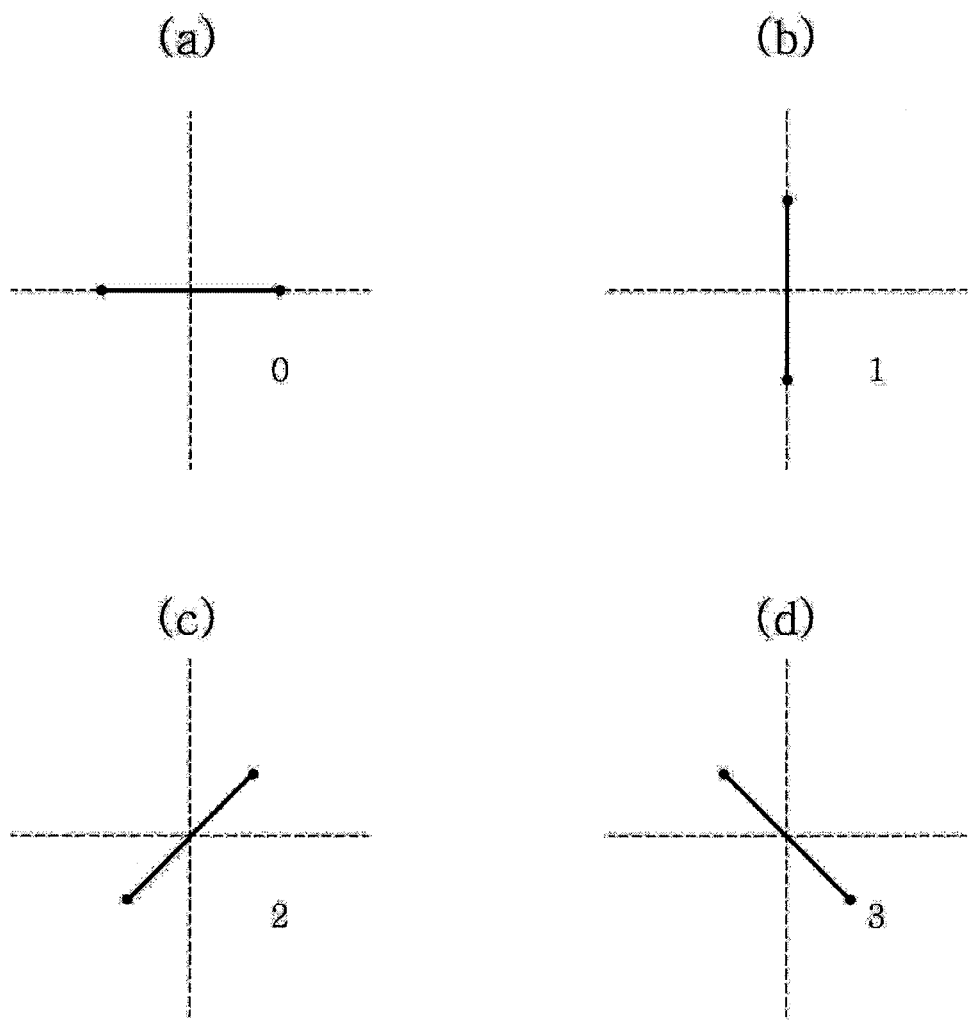
FIG. 14 shows exemplary coding of binary data displayed on the first cell according to the present invention.

FIG. 14 shows the codes of binary data displayed on the first cells according to the present invention. Assuming virtual X and Y axes intersecting with each other at the center of each cell, FIG. 14 (a) shows a first line segment lying on the X axis with the intersection point at its center; FIG. 14 (b) shows a second line segment lying on the Y axis with the intersection point at its center; FIG. 14 (c) shows a third line segment lying on the first and third quadrants with the intersection point at its center; and (d) shows a fourth line segment lying on the second and fourth quadrants with the intersection point at its center.

FIG. 15 shows a table enumerating X and Y coordinate values corresponding to the meaning value of respective line segments shown in FIG. 14. Particularly, the first line segment shown in FIG. 14 (a) has a meaning value of 0, and the corresponding X and Y coordinate value is (1,1); the second line segment shown in FIG. 14 (b) has a meaning value of 1, and the corresponding X and Y coordinate value is (0,1); the third line segment shown in FIG. 14 (c) has a meaning value of 2, and the corresponding X and Y coordinate value is (1,0); and the fourth line segment shown in FIG. 14 (d) has a meaning value of 3, and the corresponding X and Y coordinate is (0,0). Those skilled in the art can easily understand that the table shown in FIG. 15 is only an example, and the matching between the meaning values and the X and Y coordinate values may be varied as desired.

Figure 16:
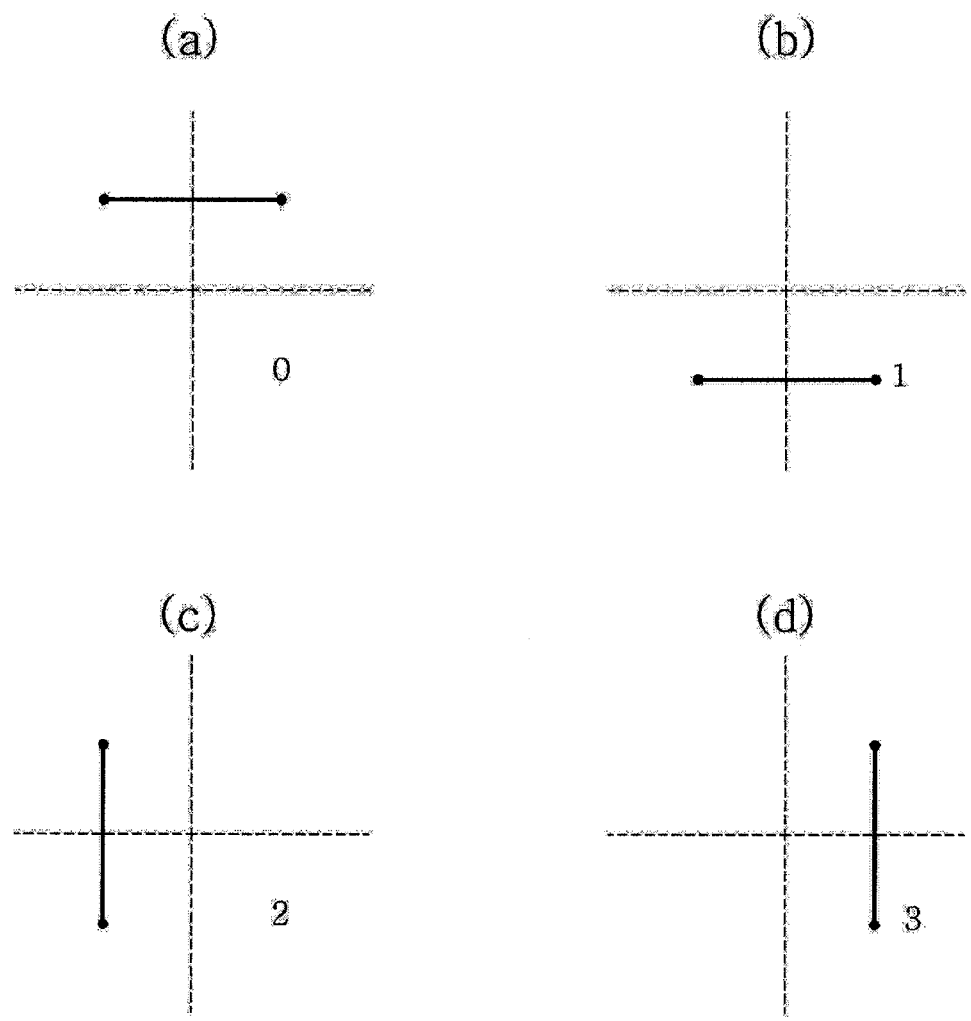
FIG. 16 shows the codes of binary data displayed on the second cell according to the present invention.

FIG. 16 shows the codes of binary data displayed on the second cells according to the present invention. Assuming virtual X and Y axes intersecting with each other at the center of each cell, FIG. 16 (a) shows a first line segment lying on the first and second quadrants in a direction parallel to the X axis; FIG. 16 (b) shows a second line segment lying on the third and fourth quadrants in a direction parallel to the X axis; FIG. 16 (c) shows a third line segment lying on the second and third quadrants in a direction parallel to the Y axis; and FIG. 16 (d) shows a fourth line segment lying on the first and fourth quadrants in a direction parallel to the Y axis.

Referring to FIG. 15, the first line segment shown in FIG. 16 (a) has a meaning value of 0, and the corresponding X and Y coordinate value is (1,1); the second line segment shown in FIG. 16 (b) has a meaning value of 1, and the corresponding X and Y coordinate value is (0,1); the third line segment shown in FIG. 16 (c) has a meaning value of 2, and the corresponding X and Y coordinate value is (1,0); and the fourth line segment shown in FIG. 16 (d) has a meaning value of 3, and the corresponding X and Y coordinate value is (0, 0).

Alternatively, the codes of binary data displayed on the second cells according to the present invention may be displayed by line segments in the same manner as in the case of the first to fourth line segments of the first cells shown in FIG. 14 (a)-(d), except that the length is varied to different them from the line segments of the first cells.

Figure 17:
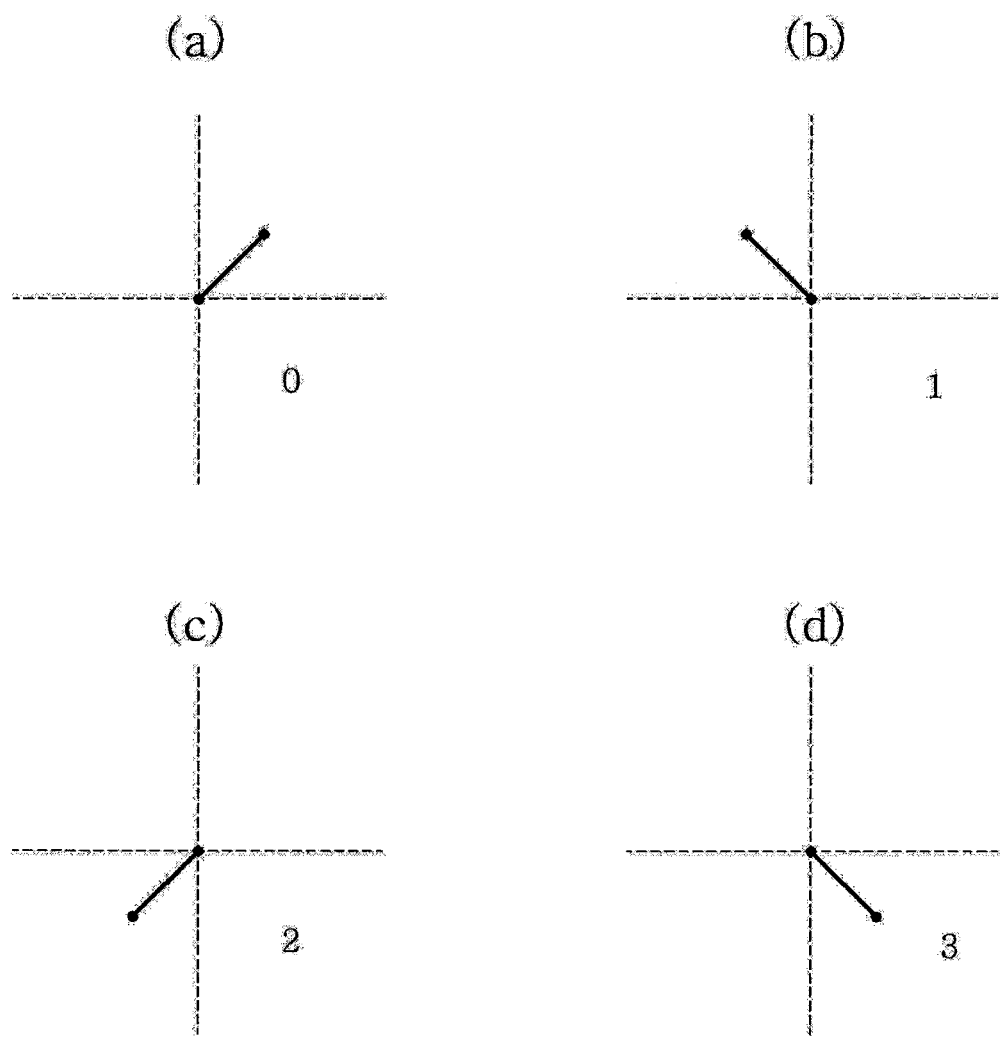
FIG. 17 shows another example of codes of binary data displayed on the second cell according to the present invention.

FIG. 17 shows another example of binary data codes displayed on the second cells according to the present invention. Assuming virtual X and Y axes intersecting with each other at the center of each cell, FIG. 17 (a) shows a first line segment extending from the intersection point to a point on the first quadrant; FIG. 17 (b) shows a second line segment extending from the intersection point to a point on the second quadrant; FIG. 17 (c) shows a third line segment extending from the intersection point to a point on the third quadrant; and FIG. 17 (d) shows a fourth line segment extending from the intersection point to a point on the fourth quadrant. These line segments correspond to X and Y coordinate values of (0,0), (0,1), (1,0), and (1,1), respectively.

Figure 18:
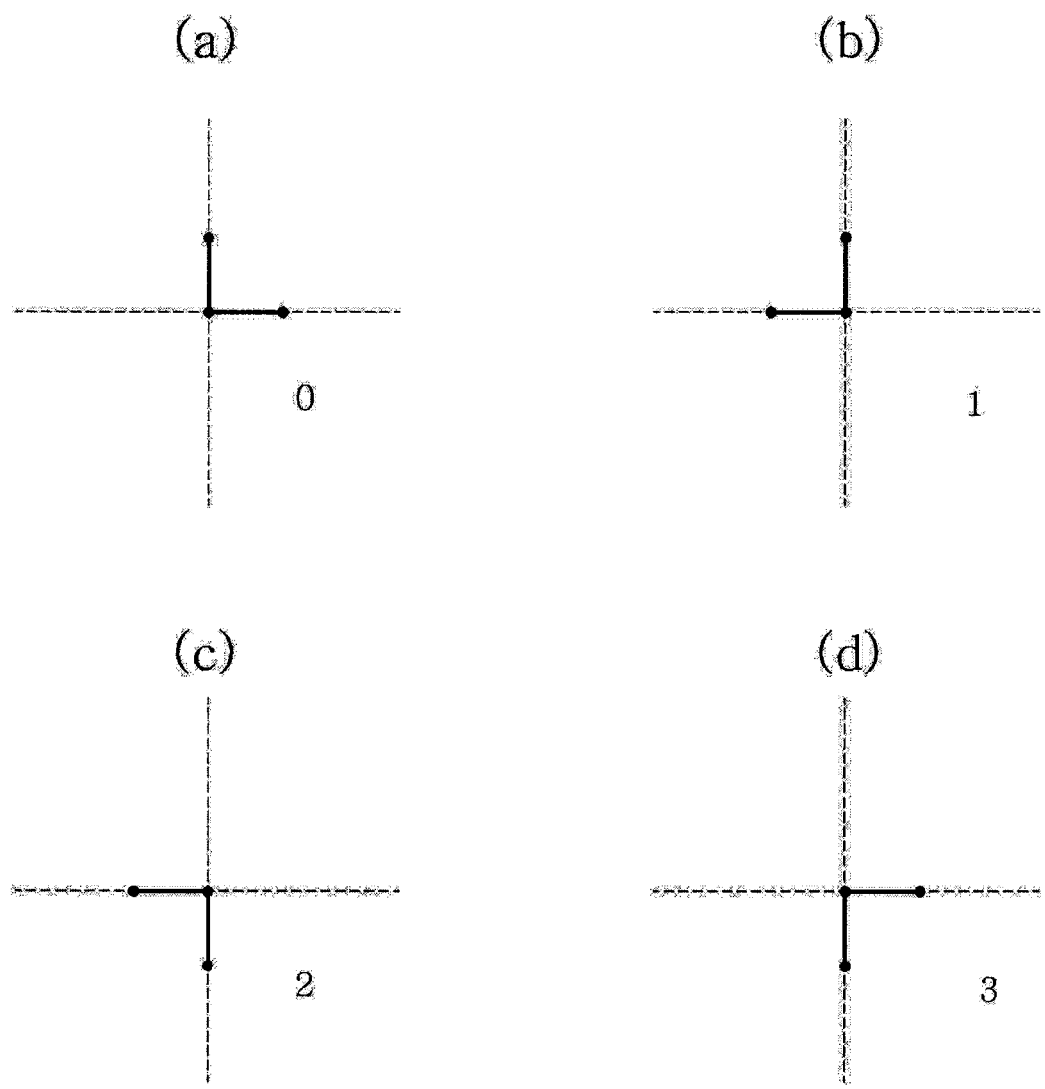
FIG. 18 shows another example of codes of binary data displayed on the second cell according to the present invention.

FIG. 18 shows another example of binary data codes displayed on the second cells according to the present invention. Assuming virtual X and Y axes intersecting with each other at the center of each cell, FIG. 18 (a) shows a first line segment lying on the positive portions of the X and Y axes with the intersection point at its center; FIG. 18 (b) shows a second line segment lying on the negative portion of the X axis and on the positive portion of the Y axis with the intersection point at its center; FIG. 18 (c) shows a third line segment lying on the negative portions of the X and Y axes with the intersection point at its center; and FIG. 18 (d) shows a fourth line segment lying on the positive portion of the X axis and on the negative portion of the Y axis with the intersection point at its center. These line segments correspond to X and Y coordinate values of (0,0), (0,1), (1,0), and (1,1), respectively.

Those skilled in the art can understand that each of the various line segments described as means to coding binary data displayed on the first or second cells according to the present invention can not only regarded as a portion of line having a predetermined length, but also as a plurality of points lying on the same line. In this regard, the maximum distance between points constituting a line segment must be shorter than the distance between any point in the corresponding cell and any point in an adjacent cell, in order to preventing such neighboring points from constituting a line segment.

In addition, although it has been assumed in the above description that respective cells display coded binary data, the type of data is not limited to that, and the data may be three-digit data, four-digit data, etc.

INDUSTRIAL APPLICABILITY

As can be seen from the foregoing, the present invention is advantageous in that absolute positioning patterns are easily realized by using simple symbols constituting data codes; the rotational condition of a product having such a pattern can be known; the precision in determining the absolute position is improved; and, even if the actual window and the coordinate window does not match with each other, the coordinate window is restored to match the actual window and find the coordinate value of the actual window. In addition, the present invention requires a smaller amount of operation to calculate the coordinate value compared with the prior art, but can display a broader position.

While this invention has been described in connection with what is presently considered to be the most practical and exemplary embodiment, it is to be understood that the invention is not limited to the disclosed embodiment and the drawings, but, on the contrary, it is intended to cover various modifications and variations within the spirit and scope of the appended claims.

The invention claimed is

1. A product having an absolute positioning pattern on a surface, the absolute positioning pattern comprising:
   first cells, each one of the first cells displaying coded binary data or coded data that combines data regarding X coordinate with data regarding Y coordinate;
   second cells, each one of the second cells displaying data coded in a manner different from the first cells or having no data; and
   a unit cell pattern formed by a group of at least a predetermined number of the first and second cells, wherein
   a combination of data corresponding to each one of the first cells within the unit cell pattern indicates an absolute coordinate of the corresponding unit cell pattern, and the unit cell pattern is differentiated from other adjacent unit cell patterns by the second cells within the unit cell pattern; and
   wherein the second cells exist in predetermined positions having no rotational symmetry within the unit cell pattern.

2. The product as claimed in claim 1, wherein the unit cell pattern comprises N×M cells, N and M being integers, N=M or N≠M.

3. The product as claimed in claim 1, wherein a position of each first cell within the unit cell pattern indicates a digit place of data indicating a value of the absolute coordinate.

4. The product as claimed in claim 3, wherein the digit place of the data becomes higher or lower along to a predetermined cell position in the first cell.

5. The product as claimed in claim 1, wherein there is at least one second cell within the unit cell pattern.

6. The product as claimed in claim 1, wherein there are at least three second cells within the unit cell pattern, and the at least three second cells are arranged in the unit cell pattern in a shape having no rotational symmetry.

7. The product as claimed in claim 6, wherein a rotational condition of the product is identified based on the second cells.

8. The product as claimed in claim 1, wherein an error of the absolute coordinate is corrected by using a value of data corresponding to the second cells within the unit cell pattern when the second cells display data coded in a manner different from the first cells.

9. The product as claimed in claim 8, wherein the error is corrected only with regard to lower bits lying at or below a predetermined digit place in data indicating the absolute coordinate.

10. The product as claimed in claim 1, wherein X and/or Y coordinate value of the absolute coordinate value of the unit cell pattern increase or decrease along to a predetermined order for said each first or second cell of an N×M cell pattern, wherein N and M are integers greater than or equal to 1.

11. The product as claimed in claim 1, wherein the binary data coded and displayed on the first cells is indicated by line segments having different arrangement angles relative to a virtual X or Y axis, a point of intersection of the X and Y axes passing through a center point of respective cells, the line segments being arranged with the point of intersection at a center, so that corresponding data has different values depending on the arrangement angles of the line segments.

12. The product as claimed in claim 1, wherein the binary data coded and displayed on the first cells is indicated by a line segment selected from the group consisting of a line segment lying on a virtual X axis with a point of intersection of the virtual X axis and a virtual Y axis at a center of the line segment, the point of intersection passing through a center point of respective cells, a line segment lying on the Y axis with the point of intersection at a center of the line segment, a line segment lying on first and third quadrants with the point of intersection at a center of the line segment, and a line segment lying on second and fourth quadrants with the point of intersection at a center of the line segment.

13. The product as claimed in claim 12, wherein the four line segments are given meaning values of 0, 1, 2, and 3, respectively, and the meaning values indicate X and Y coordinates of (0,0), (0,1), (1,0), and (1,1), respectively.

14. The product as claimed in claim 1, wherein the binary data coded and displayed on the second cells is indicated by a line segment selected from the group consisting of a line segment lying on first and second quadrants in a direction parallel to a virtual X axis intersecting with a virtual Y axis, a line segment lying on third and fourth quadrants in a direction parallel to the X axis, a line segment lying on second and third quadrants in a direction parallel to the Y axis, and a line segment lying on first and fourth quadrants in a direction parallel to the Y axis.

15. The product as claimed in claim 14, wherein the four line segments are given meaning values of 0, 1, 2, and 3, respectively, and the meaning values indicate X and Y coordinates of (0,0), (0,1), (1,0), and (1,1), respectively.

16. The product as claimed in claim 12, wherein the binary data coded and displayed on the second cells is indicated by line segments in a manner similar to the line segments of the first cells except that different lengths are used to different the line segments from the line segments of the first cells.

17. The product as claimed in claim 1, wherein the binary data coded and displayed on the second cells is indicated by a line segment selected from the group consisting of a line segment extending from a point of intersection of virtual X and Y axes to a point on a first quadrant, a line segment extending from the point of intersection to a point on a second quadrant, a line segment extending from the point of intersection to a point on a third quadrant, and a line segment extending form the point of intersection to a point on a fourth quadrant.

18. The product as claimed in claim 17, wherein the line segments have X and Y coordinate values of (0,0), (0,1), (1,0), and (1,1), respectively.

19. The product as claimed in claim 1, wherein the binary data coded and displayed on the second cells is displayed by a line segment selected from the group consisting of a line segment lying on a positive portion of a virtual X axis and on a positive portion of a virtual Y axis with a point of intersection of the X and Y axes at a center of the line segment, a line segment lying on a negative portion of the X axis and on the positive portion of the Y axis with a point of intersection of the X and Y axes at a center of the line segment, a line segment lying on the negative portion of the X axis and on a negative portion of the Y axis with a point of intersection of the X and Y axes at a center of the line segment, and a line segment lying on the positive portion of the X axis and on the negative portion of the Y axis with a point of intersection of the X and Y axes at a center of the line segment, and the line segments have X and Y coordinate values of (0,0), (0,1), (1,0), and (1,1), respectively.

20. The product as claimed in one of claims 11, 12, 14, 17, and 19, wherein the line segments are expressed by a plurality of points lying in a line, and a maximum distance between points lying on a line segment in a corresponding cell is smaller than a distance between a point in the corresponding cell and a point in an adjacent cell.

21. The product of claim 1, wherein each one of the first cells is coded by at least one line segment printed thereon, and the data corresponding to each one of the first cells is determined by the angle or position of the at least one line segment.

22. An absolute positioning pattern comprising:
   printed first cells displaying coded binary data or displaying coded data expressed in terms of at least three digits, wherein each of the first cells is coded and displayed by combining data regarding X coordinate with data regarding Y coordinate;
   second cells displaying data coded in a manner different from the first cells or having no data; and
   a unit cell pattern including the first and the second cells;
   wherein a combination of data corresponding to each one of the first cells within the unit cell pattern indicates an absolute coordinate of the corresponding unit cell pattern, and the completed unit cell pattern is differentiated among other adjacent unit cell patterns by the second cells within the unit cell pattern; and
   wherein the second cells are arranged within the unit cell pattern in a shape having no rotational symmetry.

23. The absolute positioning pattern of claim 22, wherein the unit cell pattern comprises N×M cells, N and M being integers, N=M or N≠M, the unit cell pattern comprises at least three second cells, and the second cells are connected with one another by line segments in a shape having no rotational symmetry, the shape being selected from ], ⌉, and ⊥.

24. The absolute positioning pattern of claim 23, wherein a rotational condition of the unit cell pattern is identified based on the shape of the second cells.

25. An absolute positioning pattern comprising:
first cells including first data that is coded, each of the first cells include X and Y coordinate data;
second cells including second data that is coded differently from the first data; and
a plurality of adjacent unit cell patterns each including a plurality of the first cells and at least three of the second cells, the second cells are connected with line segments that are devoid of rotational symmetry to represent a rotational orientation of each of the unit cell patterns, and the unit cell patterns are differentiated from one another based on the second data of the second cells.

26. The absolute positioning pattern of claim 25, wherein the first data is expressed in terms of at least three digits.

* * * * *